Patented Jan. 9, 1940

2,186,248

UNITED STATES PATENT OFFICE 2,186,248

EMULSIFIABLE SUBSTITUTE RESIN OILS

Arthur Lazar, Associated, Calif., assignor, by mesne assignments, to Tide Water Associated Oil Company, San Francisco, Calif., a corporation of Delaware No Drawing. Original application April 30, 1934, Serial No. 723,168. Divided and this application May 29, 1936, Serial No. 82,549

1 Claim. (Cl. 252—6)

This invention is directed to the preparation of substitute resin oils which are derived from the by-products of petroleum refining.

The principal object of the invention is to convert the by-products from refining petroleum with selective solvents such as liquid sulphur dioxide, dichloroethyl ether, phenol, nitrobenzene, furfural, and others to obtain resin oil substitutes.

Another object is to convert such by-products to obtain resin oil substitutes and a valuable emulsifying agent.

In treating petroleum, or its distillates, with such selective solvents, the solvents take up certain hydrocarbons which may generally be termed unsaturated and aromatic hydrocarbons and which, when in solution, are removed as an extract from the main body of oil under treatment. These extracted hydrocarbons are then separated from the selective solvent used, which latter is used over and over again, but up to the present time very limited use has been found for such extracted hydrocarbons, partly due to their composition and partly because they possess very undesirable features, such as dark color, strong fluorescence and instability against light.

Treatment with sulphuric acid in the usual way will not change these conditions to any marked degree, because in order to obtain any appreciable effect as to decolorizing and color stability such tremendous quantities of sulphuric acid must be used that a large portion of the extract will be converted into valueless acid sludge. Even when such a severe acid treatment is given the extract, the oil remaining after removal of acid sludge does not show features desirable for use in the many applications which this invention now provides.

In order to purify the extract to obtain lighter and permanent color, it is found that such may be accomplished in general by distilling the same, preferably under a high vacuum and with direct steam, in the presence of an alkaline material, such as caustic soda, potassium hydroxide, hydrated lime, magnesium oxide, and barium hydroxide, all of which exercise substantially the same connection and any of which may be used in the solid or solution form.

There are two ways which lead to a final distillation step, either of which may be used to obtain the desired results.

The first method consists in agitating the alkaline reagent with the extract, then removing the excess alkali together with whatever precipitate that may have been formed and distilling the treated extract in the usual manner to obtain a condensate, or the extract may be distilled under high vacuum with direct steam without removal of the alkaline material to leave from 10% to 20% of bottoms.

In the event that such excess alkali and precipitate is removed there will be no alkali dissolved in the oil when the original extract contains no organic acidic compounds, such as naphthenic acids, but any alkali contained therein will be in suspension.

However, if the original extract, or original distillate from which such extract is derived contains such organic acidic compounds, the tendency is to form oil soluble organic salts or soaps.

In either event like valuable products are obtained to be used as resin oil substitutes but the bottoms after redistillation have different properties; the bottoms from an extract containing organic acidic compounds contain valuable oil soluble soaps, such as soaps of naphthenic acid and sulphonated naphthenic acids which have a pronounced emulsifying effect in contact with water, or impart such emulsifying effects when added to ordinary mineral oils.

On the other hand, the bottoms from an extract containing no organic acidic compounds will be free from soaps and contain largely mineral salts which do not have this emulsifying property.

The second method consists in treating the extract with sulphuric acid in such quantity that it exercises no chemical effect on the oil itself, but just coagulates the resinous bodies. The point at which the coagulation of the resinous bodies is complete and a further addition of acid would have a noticeable chemical effect on the oil itself, is indicated by a liberation of $SO_2$ gas during the agitation. The amount of sulphuric acid necessary and the strength of the sulphuric acid which will bring about this desired effect varies within certain limits depending on the nature of the extract which again varies with the source of crude from which the oil originated. It has been found that acid rates can vary between one and ten pounds per barrel of extract and that the strength of sulphuric acid can vary between 90% and 98%. The variations in the nature of the extracts will be easily understood from the fact that the various solvents used for refining differ from each other quite considerably in their selectivity and that the crude distillates on which the solvents are applied differ quite considerably in their composition.

The acid sludge is then separated from the oil which is neutralized by the ordinary use of absorbent material, such as filtration through clay. Alternatively the acid treated extract, after sludge removal, may be distilled under high vacuum with direct steam in the presence of the alkaline material and the oil recovered as a desired condensate, leaving from 10% to 20% of bottoms. The effect of the alkaline reagents used is to insure a substantially complete removal of compounds of an acidic nature together with the destruction, or polymerization, of certain unstable compounds left in the oil. It would seem that the removal, or separation, of the above compounds removes the causes for restricted range in the use of the extract, insofar as the products of such a treatment show very light colors and excellent color stability.

Two specific examples of treating the extract, including the use of a small amount of sulphuric acid insufficient to cause oxidation or sulphonation of the extracted hydrocarbons are herewith given, it being noted in one example that while there is no sulphonation of the hydrocarbons there is sulphonation of organic acids, such as naphthenic acids.

Example A

An extract containing unsaturated and aromatic hydrocarbons obtained from treating a California lubricating distillate, or any other lubricating crude oil with liquid $SO_2$, being free from organic acidic compounds and having an approximate range of viscosity between 40 S. U. at 100° F. and 150 S. U. at 210° F., is agitated for about one hour with concentrated sulphuric acid (98%) at atmospheric temperature, the acid being used at the rate of about two pounds of acid per barrel of extract. The mixture is then permitted to settle for about twelve hours and the acid sludge is then removed. The acid treated extract is redistilled (preferably under vacuum) in the presence of from 0.8 to 1.0 pounds of NaOH per barrel of the extract to recover the desired resin oil substitutes, which may be fractionated to yield a light resin oil substitute comprising about 10% of the charge, a medium resin oil substitute comprising about 40% of the charge and a heavy resin oil substitute comprising about 40% of the charge, thus leaving about 10% of bottoms. In this case the bottoms contain besides residual oily constituents an appreciable quantity of salts resulting from the neutralization of the acidity imparted to the oil during acid treatment, this neutralization being the main function of the use of the alkali. Said bottoms have no particular emulsifying action when mixed with water, or with further mineral oil and water.

Example B

An extract containing unsaturated and aromatic hydrocarbons obtained from treating a California lubricating distillate, or any other lubricating crude oil, with liquid $SO_2$, containing organic acids and having an approximate range of viscosity between 40 S. U. at 100° F. and 150 S. U. at 210° F., is agitated for about one hour with concentrated sulphuric acid (98%) at atmospheric temperature, the acid being used at the rate of about 2 pounds of acid per barrel of extract. The mixture is then permitted to settle for about twelve hours and the acid sludge is then removed. The acid treated extract is redistilled (preferably under vacuum) in the presence of from 1.5 to 2 pounds of NaOH per barrel of extract to recover resin oil substitutes and bottoms in the same proportions as yielded from Example A, with the distinguishing difference that the 10% bottoms left after redistillation in the present example contain besides residual oily constituents an appreciable quantity of oil soluble soaps of organic acids and of sulfonated organic acids together with the salts of whatever other products of acid nature which have been imparted to the oil by the action of the acid. The bottoms thus obtained from the treatment by Example B have valuable emulsifying properties with water and emulsions may be made therefrom by dispersal in desired volumes of water or by diluting with further mineral oil and dispersing the dilution in water.

The extract, or resin oil substitutes, processed as above described, shows excellent compatibility with solvents like alcohol, acetone, esters and other organic compounds, a property which ordinary mineral oil does not possess. Furthermore, the treated extract is a desirable plasticizer for nitrocellulose lacquers and enamels being of a non-drying viscous character and very stable in the presence of light.

The extract may also be used as a solvent for rubber, either alone, or mixed in any proportion with other rubber solvents, as a substitute for refined resin oils, and generally as a solvent for resins, gums, varnishes or asphalt.

Likewise, the extract has a wide field as a blending material with all vegetable oils, particularly castor oil, a property which ordinary hydrocarbon oils do not possess.

The extract processed as above, has valuable and unique properties which distinguish it clearly from ordinary mineral oils.

Applicant's product has all the valuable characteristices of refined resin oils, particularly as to high solvency for and compatibility with numerous organic substances, without having the objectionable features of resin oils such as instability to oxygen and light, tendency to drying, and content of saponifiable material.

The following table gives a more detailed comparison of the characteristics of applicant's new product with ordinary mineral oil and refined resin oil:

| | Mineral oil | Refined resin oil | Applicant's product |
|---|---|---|---|
| Specific gravity | 0.90–0.94 | 0.97–1.0 | 0.96–0.99. |
| Refractive index @ 20° C. | 1.48–1.51 | 1.53–1.55 | 1.54–1.55. |
| Solubility in acetone | Slight | Complete | Complete. |
| 95% alcohol | Very slight | do | Do. |
| Aniline | Slight | do | Do. |
| Castor oil | do | do | Do. |
| Natural resins | Limited | do | Do. |
| Rubber | do | do | Do. |
| Color stability on ageing | Good | Poor | Good. |
| Tendency to dry when exposed in thin films | None | Very pronounced | None. |
| Sap value | 0.1–1.0 | 2.0–10.0 | Do. |

It will be noted that the evolution of $SO_2$ from the treatment with sulphuric acid is merely indicative of the amount of sulphuric acid which should be used, and the amount and concentration of the acid used is such as to cause substantially no oxidation or sulphonation of the extracted hydrocarbons.

This application is a division of my co-pending application, Ser. No. 723,168, filed April 30, 1934, which is a continuation of Ser. No. 492,613, filed October 31, 1930.

I claim:

An emulsifying oil comprising unsaturated and aromatic hydrocarbons derived from the treatment of a petroleum fraction containing organic acids and heavier than kerosene by distilling off in the presence of an alkali about 80% to 90% of the liquid sulfur dioxide soluble portion of such fraction, said residual oil containing in solution sufficient alkali metal soaps of said acids to render it readily emulsifiable alone with water and being soluble in mineral oil without the addition of solvency promoting agents because of the presence in the residual oil of products of reaction from said distillation.

ARTHUR LAZAR.